United States Patent
Johnson

(10) Patent No.: US 12,153,916 B2
(45) Date of Patent: Nov. 26, 2024

(54) ACCELERATING SOFTWARE CHANGE REQUESTS IN DEPLOYMENT PIPELINES

(71) Applicant: DISH Wireless L.L.C., Littleton, CO (US)

(72) Inventor: Matthew Johnson, Parker, CO (US)

(73) Assignee: DISH Wireless L.L.C., Littleton, CO (US)

( * ) Notice: Subject to any disclaimer, the term of this patent is extended or adjusted under 35 U.S.C. 154(b) by 150 days.

(21) Appl. No.: 18/068,126

(22) Filed: Dec. 19, 2022

(65) Prior Publication Data

US 2024/0201973 A1 Jun. 20, 2024

(51) Int. Cl.
*G06F 8/65* (2018.01)
*G06F 8/71* (2018.01)
*G06F 9/50* (2006.01)

(52) U.S. Cl.
CPC .......... *G06F 8/65* (2013.01); *G06F 8/71* (2013.01); *G06F 9/5005* (2013.01)

(58) Field of Classification Search
USPC .......................................................... 717/174
See application file for complete search history.

(56) References Cited

U.S. PATENT DOCUMENTS

| | | | | |
|---|---|---|---|---|
| 11,467,951 | B2 * | 10/2022 | Pillai | G06F 8/60 |
| 2009/0320019 | A1 * | 12/2009 | Ellington | G06F 8/71 |
| | | | | 717/177 |
| 2011/0029963 | A1 * | 2/2011 | Smith | H04L 67/34 |
| | | | | 709/224 |
| 2013/0346956 | A1 * | 12/2013 | Green | G06F 8/65 |
| | | | | 717/168 |
| 2016/0170747 | A1 * | 6/2016 | Luettge | G06F 8/656 |
| | | | | 717/121 |
| 2016/0350203 | A1 * | 12/2016 | Doganata | G06F 11/368 |
| 2019/0303187 | A1 * | 10/2019 | Vu | G06F 9/45558 |
| 2019/0391805 | A1 * | 12/2019 | Benedetti | G06F 8/60 |

OTHER PUBLICATIONS

Minon et al.; "Pangea: an MLOps Tool for Automatically Generating Infrastructure and Deploying Analytic Pipelines in Edge, Fog and Cloud Layers"; Sensors. Jun. 11, 2022; 22(12):4425. (Year: 2022).*

* cited by examiner

*Primary Examiner* — Qing Chen
*Assistant Examiner* — Clint Thatcher
(74) *Attorney, Agent, or Firm* — Kilpatrick Townsend & Stockton LLP

(57) ABSTRACT

Systems, machine-readable media, and methods may facilitate accelerating software change requests in deployment pipelines. Operations of a deployment pipeline for testing and deploying a software change may be monitored, the operations corresponding to a set of input requirements for testing and deploying the software change. Data composites may be collected. The data composites may be created and may include pipeline information associated with operations of the deployment pipeline. Rules corresponding to software change request protocols may be learned and may define mappings of the data composites to requirements pertaining to software change request operations of the deployment pipeline. Input required for a software change request may be decreased based on the learning so that the input required for the software change request conforms to a subset of the set of input requirements.

20 Claims, 8 Drawing Sheets

ACCELERATING SOFTWARE CHANGE REQUESTS IN DEPLOYMENT PIPELINES

FIELD

Disclosed embodiments according to the present disclosure relate generally to deployment pipelines, and in particular to systems, methods, and computer-readable media for accelerating software change requests in deployment pipelines.

BACKGROUND

Generally, software change requests (SCRs) may provide visibility into software changes being made to code in a system. Visibility into software changes may be important so that, among other things, a team can understand what the moving parts are with respect to the code changes and so that there is an audit trail. For compliance reasons, it may be advantageous to be able to inspect deployments historically. In general, software changes may provide these and other benefits.

Conventionally, making software changes is a manual process. The manual process may involve filling out forms, contacting a team and notifying the team of a software change request being in a particular state. Then, another team may perform an action with respect to the software change request and may communicate back to the original team. Such manual processes may be high-paperwork, high-back-and-forth processes that may be time-consuming, cumbersome, inefficient, and otherwise undesirable.

There is a need for systems, methods, and computer-readable media for accelerating software change requests in deployment pipelines. This and other needs are addressed by the present disclosure.

BRIEF SUMMARY

Certain embodiments of the present disclosure relate generally to deployment pipelines, and in particular to systems, methods, and computer-readable media for accelerating software change requests in deployment pipelines.

In one aspect, a system is disclosed. The system may include one or more processing devices and memory communicatively coupled with and readable by the one or more processing devices and having stored therein processor-readable instructions which, when executed by the one or more processing devices, cause the one or more processing devices to perform one or a combination of the following operations. Operations of a deployment pipeline for testing and deploying a software change to a production computing service may be monitored. The operations may correspond at least in part to a set of input requirements for the testing and the deploying of the software change. Based at least in part on the monitoring, data composites may be collected in a data storage. Each data composite may include pipeline information associated with one or more operations of the deployment pipeline. The collecting may include one or a combination of: receiving the pipeline information via a network interface; creating the data composites, where the data composites may include the pipeline information associated with the one or more operations of the deployment pipeline; and storing the data composites in the data storage. Based at least in part on the data composites, rules corresponding to one or more software change request protocols may be learned. The rules may define mappings of the data composites to requirements pertaining to software change request operations of the deployment pipeline. Input required for a software change request may be decreased based at least in part on the learning so that the input required for the software change request conforms to a subset of the set of input requirements.

In another aspect, one or more non-transitory, machine-readable media are disclosed. The one or more non-transitory, machine-readable media may have machine-readable instructions thereon which, when executed by one or more processing devices, cause the one or more processing devices to perform one or a combination of the following operations. Operations of a deployment pipeline for testing and deploying a software change to a production computing service may be monitored. The operations may correspond at least in pan to a set of input requirements for the testing and the deploying of the software change. Based at least in part on the monitoring, data composites may be collected in a data storage. Each data composite may include pipeline information associated with one or more operations of the deployment pipeline. The collecting may include one or a combination of: receiving the pipeline information via a network interface; creating the data composites, where the data composites may include the pipeline information associated with the one or more operations of the deployment pipeline; and storing the data composites in the data storage. Based at least in part on the data composites, rules corresponding to one or more software change request protocols may be learned. The rules may define mappings of the data composites to requirements pertaining to software change request operations of the deployment pipeline. Input required for a software change request may be decreased based at least in part on the learning so that the input required for the software change request conforms to a subset of the set of input requirements.

In yet another aspect, a method is disclosed and may include one or a combination of the following. Operations of a deployment pipeline for testing and deploying a software change to a production computing service may be monitored. The operations may correspond at least in part to a set of input requirements for the testing and the deploying of the software change. Based at least in part on the monitoring, data composites may be collected in a data storage. Each data composite may include pipeline information associated with one or more operations of the deployment pipeline. The collecting may include one or a combination of: receiving the pipeline information via a network interface; creating the data composites, where the data composites may include the pipeline information associated with the one or more operations of the deployment pipeline; and storing the data composites in the data storage. Based at least in part on the data composites, rules corresponding to one or more software change request protocols may be learned. The rules may define mappings of the data composites to requirements pertaining to software change request operations of the deployment pipeline. Input required for a software change request may be decreased based at least in part on the learning so that the input required for the software change request conforms to a subset of the set of input requirements.

In various embodiments, the decreasing the input may include selecting a subset of input attributes from a set of input attributes. The set of input attributes may specify data fields pertaining to the software change request. The subset of input attributes may specify a subset of the data fields. In various embodiments, based at least in part on the subset of input attributes and the rules corresponding to one or more software change request protocols, a set of objects to facilitate setup of the software change request may be generated, the set of objects corresponding at least in part to the data composites. In various embodiments, input received via a user interface of the deployment pipeline may be processed, the received input conforming to the subset of the set of input requirements. In various embodiments, the set of objects may be stored in association with the software change request, and the set of objects may be populated at least in part with the data composites. In various embodiments, the software change request may be configured in accordance with a software change request protocol, using the populated set of objects. In various embodiments, the collecting may further include analyzing the operations corresponding to testing and/or deploying one or more software changes to identify the pipeline information associated with one or more operations of the deployment pipeline.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 4 illustrates an example input file corresponding to decreased input provided by a developer for an SCR, in accordance with embodiments according to the present disclosure.

FIGS. 6A and 6B illustrate an example SCR, in accordance with embodiments according to the present disclosure.

DETAILED DESCRIPTION

Figure 1:
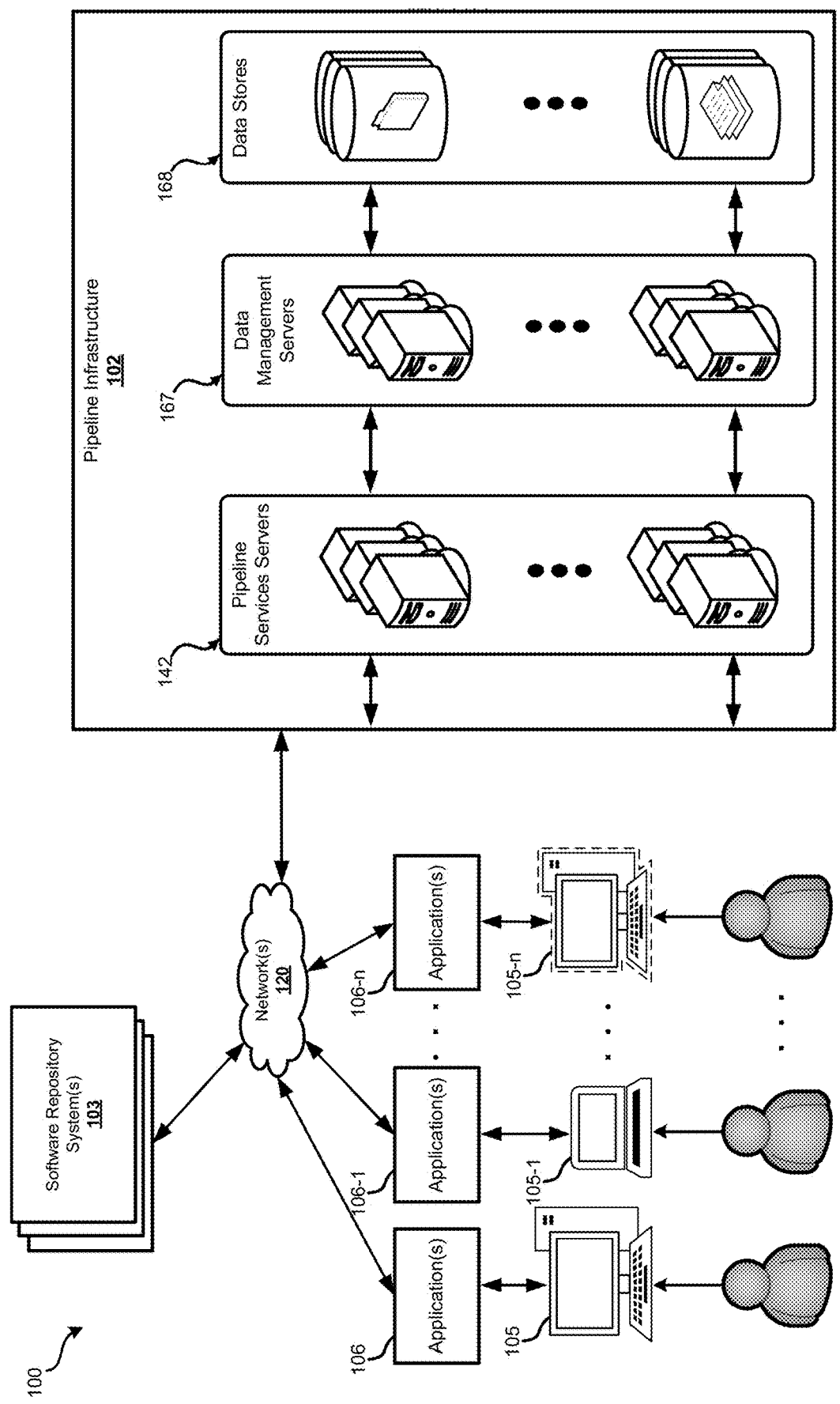
FIG. 1 illustrates a high-level block diagram of an environment to facilitate a production computing service deploy via continuous deployment pipeline, in accordance with embodiments according to the present disclosure.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Various embodiments according to the present disclosure may provide for technological solutions to multiple problems existing with conventional systems and approaches to software changes in deployment pipelines used to facilitate production computing services. Conventional systems and approaches are deficient in addressing, with flexibility and speed, software changes in a manner that is streamlined from the viewpoint of users. However, various embodiments according to the present disclosure may provide for automation of software changes in an application deployment pipeline that accelerates the speed of making software changes with flexibility to accommodate a variety of software change needs and in a manner that is streamlined from the viewpoint of users.

With disclosed embodiments, the automation of software changes may be configured to accept input from one or more developers (e.g., DevOps users). For example, the input may correspond to approximately 5 lines of input per deployment, that may correspond to minimized input that is made possible by the learning features disclosed herein. Other embodiments may utilize greater or less than 5 lines of input. That input may be taken, pipeline operations data (e.g., data and metadata that may be generated and/or collected by the pipeline automation on-the-fly for every deployment). Based at least in part on the input and the pipeline operations data, software change requests (SCRs) may be constructed automatically.

Various embodiments will now be discussed in greater detail with reference to the accompanying figures, beginning with FIG. 1.

FIG. 1 depicts a high-level block diagram of an environment 100 to facilitate a production computing service deploy via continuous deployment pipeline, in accordance with certain embodiments of the present disclosure. In some embodiments, the environment 100 may be a cloud computing environment. The environment 100 may correspond to a distributed system that includes one or more client computing devices 105. In various embodiments, each client computing device 105 may be configured to operate one or more client applications 106 such as a web browser, a proprietary client application, a web-based application, an entity portal, a mobile application, a widget, or some other application, which may be used by a user of the endpoint device to interact with the pipeline infrastructure 102 and the software repository systems 103 to use services provided by the pipeline infrastructure 102 and the software repository systems 103 over one or more network(s) 120.

A developer, using a client computing device 105, may interact with the pipeline infrastructure 102 by requesting one or more services provided by the pipeline infrastructure 102. In some embodiments, the developer may access a cloud user interface. The pipeline services provided by the pipeline infrastructure 102 may include virtual machine instances for the developers to use, in some embodiments. The client computing devices 105 may be general purpose personal computers including, by way of example, personal computers and/or laptop computers running various versions of Microsoft Windows®, Apple Macintosh®, and/or Linux operating systems. The client computing devices can be workstation computers running any of a variety of UNIX® or UNIX-like operating systems, including without limitation the variety of GNU/Linux operating systems, such as for example, Google Chrome OS. Alternatively, or in addition, client computing devices 105 may be any other electronic device, such as a thin-client computer capable of communicating over network(s) 120. The client computing devices 105 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, and/or the like, and being Internet, e-mail, short message service (SMS), or other communication protocol enabled.

In general, the one or more networks 120 may be used for bi-directional communication paths for data transfer between components of environment 100. Disclosed embodiments may transmit and receive data, including video content, via the networks 120 using any suitable protocol(s). The networks 120 may be or include one or more next-generation networks (e.g., 5G wireless networks and beyond). Further, the plurality of networks 120 may correspond to a hybrid network architecture with any number of terrestrial and/or non-terrestrial networks and/or network features, for example, cable, satellite, wireless/cellular, or Internet systems, or the like, utilizing various transport technologies and/or protocols, such as radio frequency (RF), optical, satellite, coaxial cable, Ethernet, cellular, twisted pair, other wired and wireless technologies, and the like. In various instances, the networks 120 may be implemented with, without limitation, satellite communication with a plurality of orbiting (e.g., geosynchronous) satellites, a variety of wireless network technologies such as 5G, 4G, LTE (Long-Term Evolution), 3G, GSM (Global System for Mobile Communications), another type of wireless network (e.g., a network operating under Bluetooth®, any of the Institute of Electrical and Electronics (IEEE) 802.11 suite of protocols, and/or any other wireless protocol), a wireless local area network (WLAN), a HAN (Home Area Network) network, another type of cellular network, the Internet, a wide area network (WAN), a local area network (LAN) such as one based on Ethernet, Token-Ring and/or the like, such as through etc., a gateway, and/or any other appropriate architecture or system that facilitates the wireless and/or hardwired packet-based communications of signals, data, and/or message in accordance with embodiments disclosed herein. In various embodiments, the networks 120 and its various components may be implemented using hardware, software, and communications media such wires, optical fibers, microwaves, radio waves, and other electromagnetic and/or optical carriers; and/or any combination of the foregoing and/or the like. In various instances, the networks 120 may transmit data using any suitable communication protocol(s), such as TCP/IP (Transmission Control Protocol/Internet protocol), SNA (systems network architecture), IPX (Internet packet exchange), UDP, AppleTalk, and/or the like.

One or more server systems may be communicatively coupled with one or more remote computing devices 105 via the network(s) 120. For example, the environment 100 may include a pipeline infrastructure 102 that may include or otherwise correspond to one or more server systems. Further, the environment 100 may include one or more software repository systems 103 that may include or otherwise correspond to one or more server systems. Likewise, in some embodiments, the client computing side of the environment 100 may include or otherwise correspond to one more server systems.

In various embodiments, the one or more server systems may be adapted to run one or more services or software applications provided by one or more of the components of the respective system (e.g., the pipeline infrastructure 102). In some embodiments, these services may be offered as web-based or cloud services or under a Software as a Service (SaaS) model to the users of client computing devices 105. Users operating client computing devices 105 may in turn utilize one or more client applications to interact with the pipeline infrastructure 102 and/or the one or more software repository systems 103 to utilize the services provided by these components.

The one or more server systems of the pipeline infrastructure 102 may implement software components to facilitate various embodiments disclosed herein. In some embodiments, one or more of the components of the pipeline infrastructure 102 and/or the services provided by components thereof may also be implemented by one or more of the client computing devices 105. Users operating the client computing devices 105 may then utilize one or more client applications 106 to use the services provided by these components. These components may be implemented in hardware, firmware, software, or combinations thereof. It should be appreciated that various system configurations are possible, which may be different from the distributed system. The embodiment shown in the figure is thus one example of a distributed system for implementing an exemplary system and is not intended to be limiting.

As illustrated, various embodiments may include one or more pipeline services servers 142, one or more data management servers 167 configured to manage pipeline services data and one or more data stores 168 (which may store pipeline services data), and/or the like. The one or more pipeline services servers 142 may be configured to provide deployment pipeline services (e.g., to developers using the client computing devices 105) to facilitate production computing services. With the pipeline services provided, developers may provision, launch and manage virtual computing resources in the cloud. Such cloud-based pipeline services may be provided for various geographic locations/regions and may be segregated in a variety of manners according to geographic, jurisdictional, and/or designs to minimize faults, maximize availability, minimize latency, and/or the like.

In some embodiments, the services provided by the pipeline infrastructure 102 may include one or more services provided under Software as a Service (SaaS) category, Platform as a Service (PaaS) category, Infrastructure as a Service (IaaS) category, or other categories of services including hybrid services. Developers may order one or more services provided by the pipeline infrastructure 102. The pipeline infrastructure 102 may then perform processing to provide the services in accordance with the orders. In some embodiments, the services provided by the pipeline infrastructure 102 may include, without limitation, application services, platform services, and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, developers may utilize applications executing on the cloud pipeline infrastructure 102. Various SaaS services may be provided.

In some embodiments, platform services may be provided by the cloud pipeline infrastructure 102 via a PaaS platform. The PaaS platform may be configured to provide cloud pipeline services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. By utilizing the pipeline services provided by the PaaS platform, developers may employ programming languages and tools supported by the cloud infrastructure system and control the deployed services. In some embodiments, platform services provided by the cloud infrastructure system may include database cloud services, middleware cloud services, and Java cloud services. Middleware cloud services may provide a platform for developers to develop and deploy various business applications, and Java cloud services may provide a platform for customers to deploy Java applications, in the cloud pipeline infrastructure system 102. Various infrastructure services may be provided by an IaaS platform in the cloud pipeline infrastructure system 102. The infrastructure services facilitate the management and control of the underlying computing resources, such as storage, networks, and other fundamental computing resources for users utilizing services provided by the SaaS platform and the PaaS platform.

In some embodiments, cloud management functionality may be provided by one or more modules, such as an order management module, an order orchestration module, an order provisioning module, an order management and monitoring module, an identity management module, and/or the like. These modules may include or be provided using one or more computers and/or servers, which may be general purpose computers, specialized server computers, server farms, server clusters, or any other appropriate arrangement and/or combination.

In various embodiments, the pipeline infrastructure 102 may be composed of one or more specialized computers, specialized server computers (including, by way of example, PC (personal computer) servers, UNiX® servers, mid-range servers, mainframe computers, rack-mounted servers, etc.), server farms, server clusters, or any other appropriate arrangement and/or combination. In various embodiments, the pipeline infrastructure 102 may be adapted to run one or more services described herein. The pipeline infrastructure 102 may run an operating system, which may correspond to a server operating system. The pipeline infrastructure 102 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those available from AWS, Oracle, Microsoft, Sybase, IBM (International Business Machines), and the like.

In some implementations, the pipeline infrastructure 102 may include one or more applications to analyze and consolidate data feeds and/or event updates received from users of client computing devices 105. As an example, data feeds and/or event updates may include, but are not limited to, updates, which may be real-time updates, received from the one or more client computing devices 105, the software repository system 103, and/or other components of the pipeline infrastructure 102, which may include real-time events related to deployment, software change requests, software changes, and the like aspects disclosed herein. The pipeline infrastructure 102 may also include one or more applications to display the data feeds and/or real-time events via one or more display devices of client computing devices 105.

The one or more data stores 168 may include one or more databases that may reside in a variety of locations. By way of example, one or more databases may reside on a non-transitory storage medium local to (and/or resident in) one or more servers of the pipeline infrastructure 102. Alternatively, databases may be remote from one or more servers and in communication with the one or more servers via a network-based or dedicated connection. In one set of embodiments, databases may reside in a storage-area network (SAN). Similarly, any necessary files for performing the functions attributed to the one or more servers may be stored locally on the one or more servers and/or remotely, as appropriate. In one set of embodiments, the databases may include relational databases that are adapted to store, update, and retrieve data in response to SQL-formatted commands.

The pipeline services provided by the pipeline infrastructure 102 may be structured in stages and may facilitate building, testing, and releasing software to production services. Further, once software is deployed to production service, various changes to the software may be needed (e.g., the code, application, and/or specifications corresponding to a change in previously deployed software). The process of making software changes may involve software change request (SCR) processes. As referenced herein, a software change request (SCR) may include not only the request, but also the software change (e.g., the code, application, and/or specifications corresponding to the software change). Moreover, while embodiments are disclosed herein with respect to SCRs as an example, is embodiments may likewise be applicable to initial code deployments and not just the software changes that follow initial code deployments.

Figure 2:
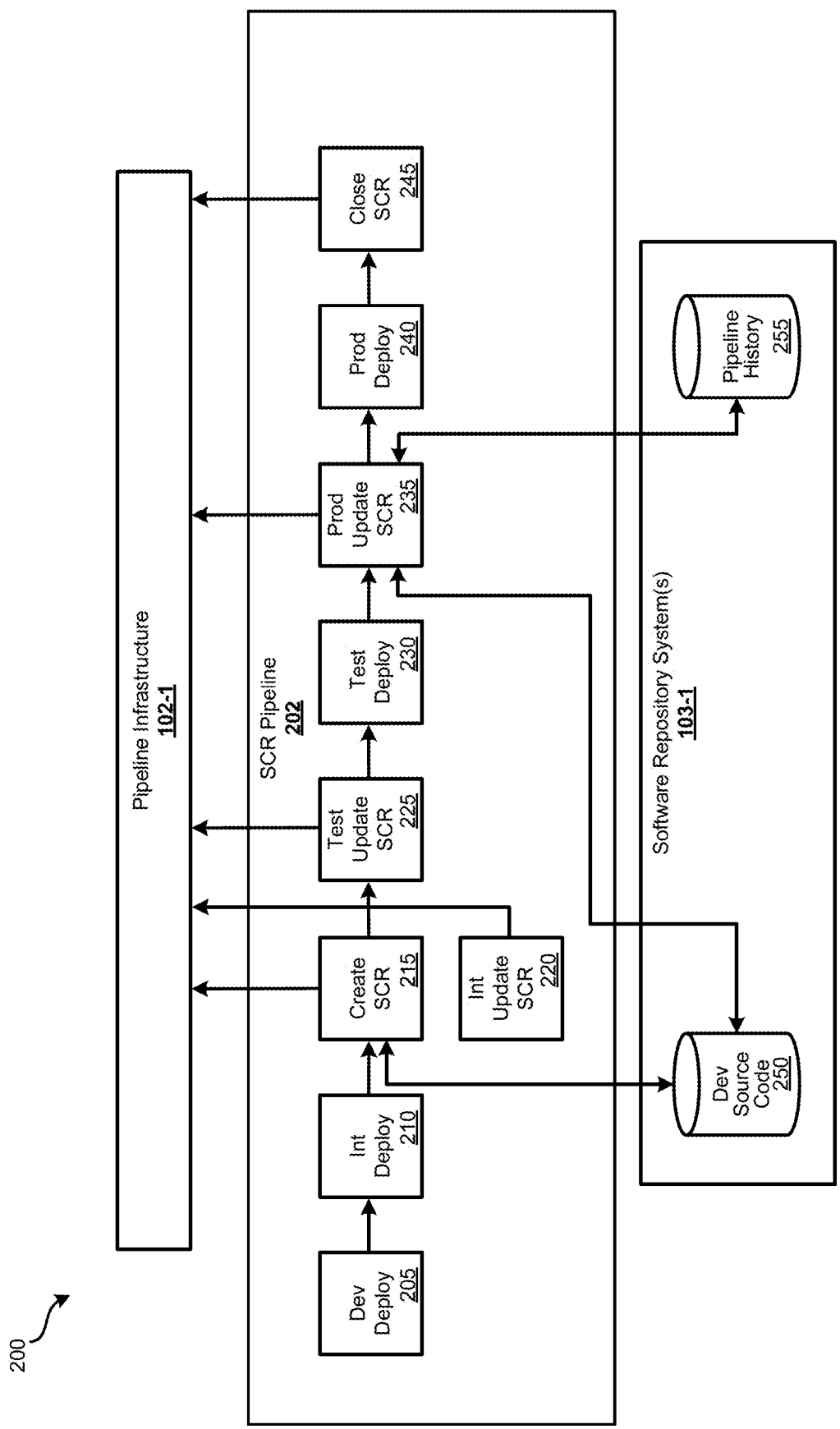
FIG. 2 illustrates a functional diagram of one example SCR pipeline system to facilitate pipeline services, in accordance with embodiments according to the present disclosure.

FIG. 2 illustrates a functional diagram of one example SCR pipeline system 200 to facilitate pipeline services, in accordance with embodiments of the present disclosure. The SCR pipeline system 200 may include one or a combination of the pipeline infrastructure 102, an SCR pipeline 202, and one or more software repository systems 103. The SCR pipeline 202 may be configured to operate in accordance with an SCR flow to facilitate pipeline services. The SCR pipeline 202 may be a custom pipeline that automates SCRs with minimal input, low information needed, and low friction. In some embodiments, the SCR flow may operate according to the operational flow diagram depicted in the example of FIG. 2. The example SCR flow may illustrate deployment stages of the SCR pipeline 202, through at least some of which SCRs may progress.

The pipeline services may include pipeline deployment agents of the pipeline infrastructure 102 that may include software applications to automate software deployment and software changes deployment through various stages to production services corresponding to a production deployment 240. Such automation of software and software change deployments may include continuously integrating software, configuration states, scripts, artifacts, and or the like into production services corresponding to production deployment 240. The pipeline deployment agents may facilitate the deployment pipeline in stages that may include preproduction stages, where the developed software may be automatically tested. The stages may further include deployment integration testing with the software deployed in a preproduction environment, which may allow for testing with traffic and data that may correspond to actual traffic and data that will be experienced in the production environment. In various embodiments, such preproduction stages and/or deployment integration stages may include an initial development environment 205, an integration environment 210, an SCR creation stage 215, an SCR integration update stage 220, an SCR testing update stage 225, a deployment testing stage 230, an SCR production update stage 235, and/or other alpha, beta, and/or gamma testing stages. Once gamma testing is successfully completed and validated, the software may be pushed to production with the production stage 240. This may involve the pipeline deployment agents partially, incrementally, and/or fully deploying the software to production service.

With one or more of the preproduction stages, the pipeline deployment agents may build executables (e.g., applications, code segments, etc.) of the software and software changes from a source code repository 250 (e.g., software repository system 103), which may store the software and software change specifications provided in part by the developers. The pipeline deployment agents may run automated tests on the executables and monitor the tests to identify correct functioning, errors, conflicts, performance metrics, etc. as the executables progress toward production deployment 240. Upon successful testing and validations, the pipeline deployment agents may advance the executables to toward production deployment 240. However, when incorrect functioning, errors, conflicts, failures to satisfy performance metrics threshold, and or the like are identified, the pipeline deployment agents may rollback the executables to a prior version and/or stage, and may notify the developers of pertinent log data, test results, reports, and/or the like regarding the unsuccessful testing and/or validations.

As illustrated, an SCR may be introduced after developers trigger software deployment into the development environment 205 and the integration environment 210. After deployment to the integration environment 210, but before deployment to the deployment testing stage 230, an SCR may be created at the SCR creation stage 215. The SCR creation may be triggered automatically after a successful integration deployment.

Figure 3:
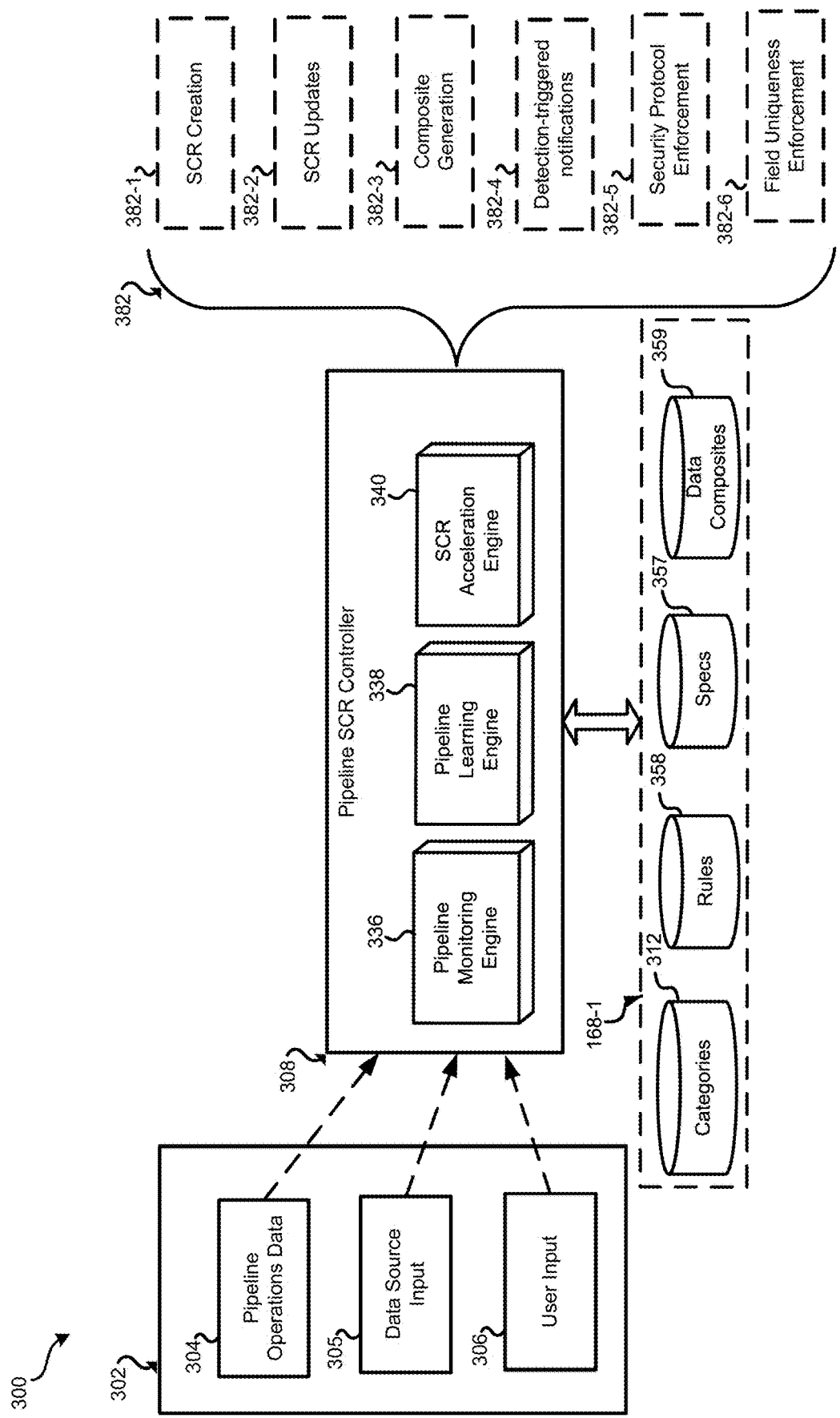
FIG. 3 illustrates a functional diagram of a subsystem to accelerate software change requests in conformance with learned software change request protocols with the SCR pipeline system, in accordance with embodiments according to the present disclosure.

FIG. 3 illustrates a functional diagram of a subsystem 300 to accelerate software change requests in conformance with learned software change request protocols with the SCR pipeline system 200, in accordance with certain embodiments of the present disclosure. While the subsystem 300 is illustrated as being composed of multiple components, the subsystem 300 may be broken into a greater number of components or collapsed into fewer components. Each component may include any one or combination of computerized hardware, software, and/or firmware.

In some embodiments, the pipeline infrastructure 102 may include the subsystem 300. In some embodiments, the pipeline infrastructure 102 may be configured to cooperate the applications 106 to provide the features of the subsystem 300, with aspects of the subsystem 300 distributed between the client computing devices 105 and the remotely-located pipeline infrastructure 102. In some embodiments implementing the subsystem 300 at least partially with the pipeline infrastructure 102, the subsystem 300 may be, correspond to, and/or include one or more servers one or more network interfaces, one or more processors, memory, and/or other components disclosed herein. The subsystem 300 may be configured to accelerate software change requests in conformance with learned software change request protocols.

As the SCRs move through the application deployment pipeline, SCR creation and updates on the SCRs (and corresponding code/application) may be made by the subsystem 300 in an automated way. The updates may include updating who is making approvals, updating what state a particular SCR is in, updating timestamps, updating activity logs (e.g., in data storage 168), and/or the like. One end-result may correspond to utilizing minimal input to couple the rest of it with the application deployment, instead of being high-paperwork, high-back-and-forth process. This may allow for a high level of visibility with very little manual effort.

In some embodiments, the subsystem 300 may include one or more adaptive processing and controlling devices 308 (which may be referenced as "pipeline SCR controller" or "pipeline controller") and one or more storage repositories that may correspond to data stores 168. In various embodiments, the one or more adaptive processing and controlling devices 308 may include one or more of engines and/or modules that may be stored in the one or more memories and may include one or more software applications, executable with the processors, for receiving and processing requests and communications. The one or more of engines and/or other modules may be configured to perform any of the steps of methods described in the present disclosure.

As depicted, the subsystem 300 may include one or more repositories 168. For example, in various embodiments, a categories repository 312 may store any suitable data to facilitate any input, SCR, and/or software change categorization, correlation, qualification, scoring, and/or the like disclosed herein in any suitable manner. In various embodiments, a rules repository 358 may store any suitable data to facilitate any rules, protocols, criteria, process flows, and/or the like disclosed herein in any suitable manner. In various embodiments, a specifications repository 357 may store any suitable data to facilitate any specifications, referencing, linking, mapping, and/or the like with respect to input, SCRs, software changes, categories 312, rules 358, data composites 359, and/or the like disclosed herein in any suitable manner. In various embodiments, the data composites 359 repository 359 may store any suitable data to facilitate any data composites 359, observation data, patterns, conclusions, inferences, and/or the like with respect to input, SCRs, software changes, and/or the like disclosed herein in any suitable manner. Although the repositories are depicted as being separate, in various embodiments, a single repository may be utilized or separate repositories may be used in any suitable manner.

In some embodiments, the one or more engines of the pipeline controller 308 may include one or more pipeline monitoring engines 336 that may include logic to implement and/or otherwise facilitate the pipeline monitoring features disclosed herein. In various embodiments, for example, the pipeline controller 308 (e.g., using the one or more monitoring engines 336) may receive pipeline input 302 by way of one or a combination of API calls, push operations, pull operations, polling operations, listening to one or more communication buses, and/or the like. Additionally or alternatively, the one or more engines of the pipeline controller 308 may include one or more pipeline learning engines 338 that may include logic to implement and/or otherwise facilitate the pipeline learning features disclosed herein. In various embodiments, for example, the pipeline controller 308 (e.g., using the one or more learning engines 338) may learn one or a combination of rules 358, corresponding software change request protocols, data composites 359, corresponding parameter values, constraints, and/or the like to accelerate and adjust pipeline operations in order to create, process, progress, and otherwise facilitate SCRs and software changes based on decreased developer input. Additionally or alternatively, the one or more engines of the pipeline controller 308 may include one or more acceleration engines 340 that may include logic to implement and/or otherwise facilitate the pipeline acceleration and operational adjustment features disclosed herein. In various embodiments, for example, the pipeline controller 308 (e.g., using the one or more acceleration engines 340) may configured to cause the one or more adjustments 382 disclosed herein. In some embodiments, the acceleration engine 340 may analyze input monitored by the monitoring engine 336, determinations of the learning engine 338, and/or information stored in one or more repositories 168 to make adjustment 382 determinations. Based at least in part on one or more adjustment 382 determinations, the acceleration engine 340 may cause activation of one or more adjustment 382 operations. By way of example, the adjustments 382 may include one or a combination of SCR creation 382-1; SCR updates 382-2; which may include progression and rollback operations of an SCR through the pipeline; composite generation 382-3; detection-triggered notifications 382-4, which may facilitate pipeline flow operations and/or prompting of developers to take actions; security protocol enforcement 382-5, which may include enforcement of compliance operations and/or constraints to satisfy compliance requirements; field uniqueness enforcement 382-6; and/or the like adjustment features disclosed herein.

In some embodiments, the one or more monitoring engines 336 may use one or more pipeline deployment agents to implement and/or otherwise facilitate the pipeline monitoring features. For example, as part of the pipeline monitoring, the one or more monitoring engines 336 may monitor operations of the deployment pipeline for testing and deploying software changes to production computing services. The operations may correspond at least in part to one or more sets of input requirements for the testing and the deploying of the software changes. The pipeline controller 308 may be communicatively coupled with interface components and communication channels (which may take various forms in various embodiments as disclosed herein) configured to receive pipeline input 302.

With disclosed embodiments, the automation of software changes by the subsystem 300 may be configured to accept input 306 from one or more developers. For example, the input 306 may correspond to approximately 5 lines of input per deployment, that may correspond to minimized input that is made possible by the learning features (which may include machine learning in some embodiments) of the subsystem 300. Other embodiments may utilize greater or less than 5 lines of input 306. That input 306 may be inspected by the subsystem 300, along with pipeline operations data 304 (e.g., pipeline history 255 data, data and metadata that may be generated and/or collected by the pipeline automation on-the-fly for every deployment, tag data for the various versions of code released, and/or the like). Based at least in part on the input 306 and the pipeline operations data 304, SCRs may be constructed automatically by the subsystem 300.

Figure 4:
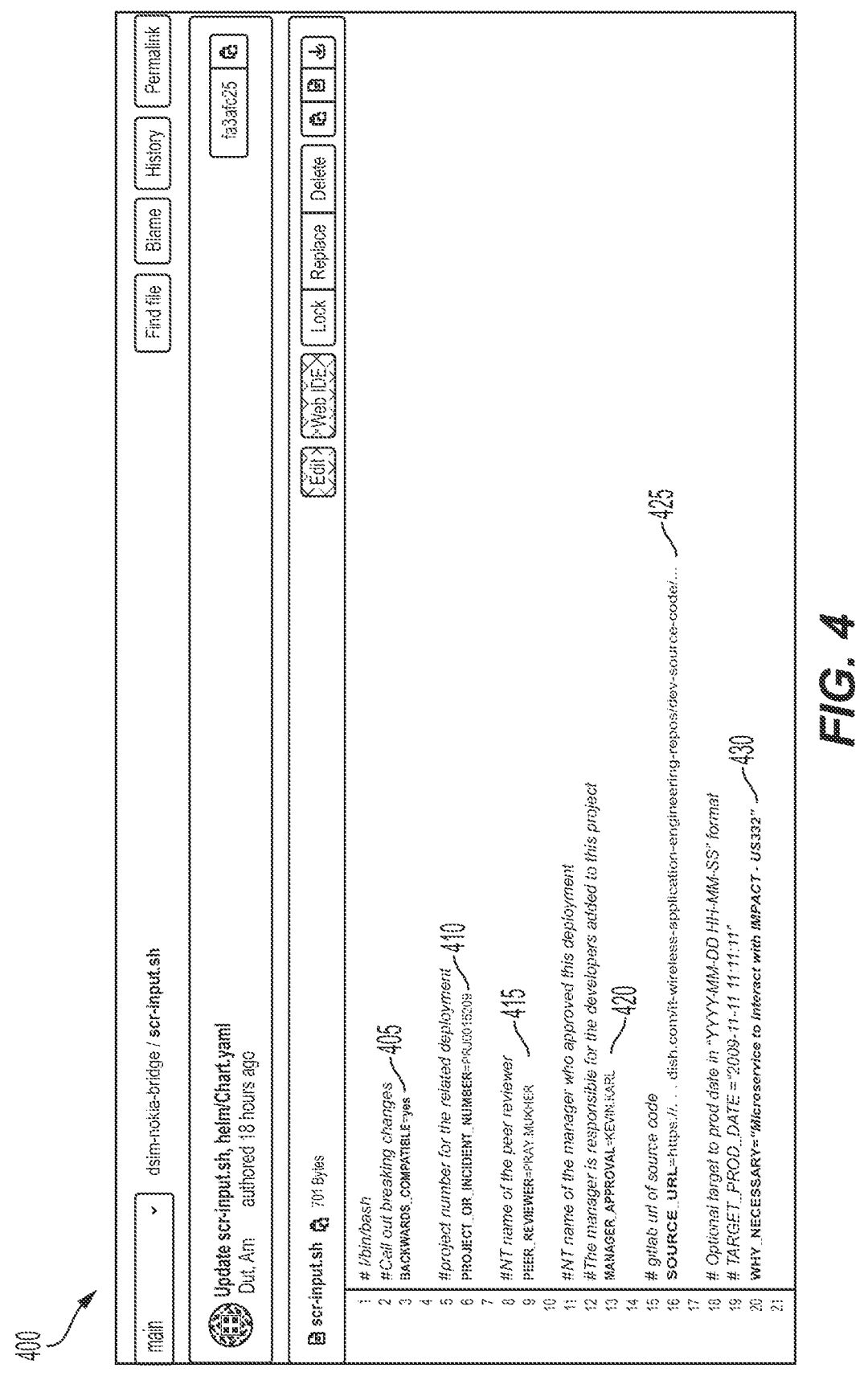

FIG. 4 illustrates an example input file 400 corresponding to decreased input provided by a developer for an SCR, in accordance with embodiments of the present disclosure. The input file 400 may correspond to input required for an SCR after the subsystem 300 has decreased input requirements for an SCR based at least in part on the learning features. As in the example depicted, only 6 lines of input may be required from the developer to effect the SCR, given the intelligence features of the subsystem 300. Other embodiments may have a different number of lines of input required (e.g., 5 or less). The first input 405 may correspond to an indication of whether the SCR is backwards compatible. The second input 410 may correspond to a project or incident number (e.g., for the related deployment). The third input 415 may correspond to a specification of a peer reviewer. The fourth input 420 may correspond to a specification of a manager approval of the deployment. The fifth input 425 may correspond to a URL of the source code, which may, for example, be stored at a software repository system 103. The sixth input 430 may correspond to a description of necessity for the SCR. Other embodiments are possible. For example, various input may be provided in various forms (e.g., input entry into the fields of a GUI, selection of GUI options, drag-and-drop options, and/or the like).

Referring again to FIG. 3, as depicted, the pipeline input 302 may include pipeline operations data 304, software repository system input 305, and user input 306. The subsystem 300 may process the pipeline input 302 and analyze the pipeline input 302 to provide for the SCR and software change acceleration features disclosed herein. The software repository system input 305 may correspond to input received from the one or more software repository systems 250, such as source code 250, pipeline history information 255, and/or the like, that may be received via one or more data acquisition interfaces of the pipeline infrastructure 102. The user input 306 may, for example, correspond to selections and other input provided by developers via interface elements of the client computing devices 105, as disclosed herein. In some embodiments, the user input 306 may include source code directly provided by the developers, instead of, or in addition to, receiving source code from a software repository system 103.

Figure 5:
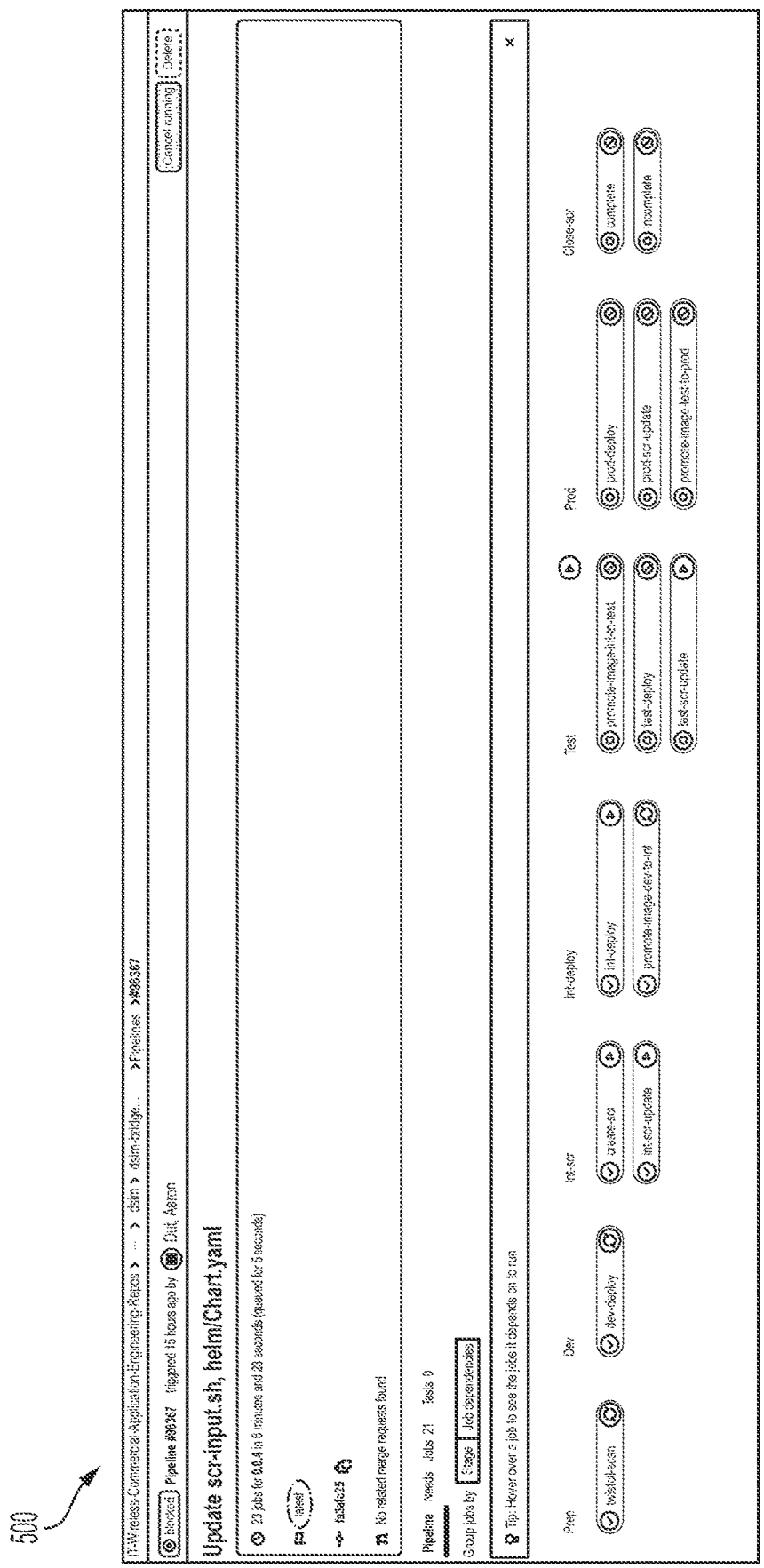
FIG. 5 illustrates a portion of an example user interface corresponding to the SCR pipeline, in accordance with embodiments according to the present disclosure.

FIG. 5 illustrates a portion of an example user interface 500 corresponding to die SCR pipeline 200, in accordance with embodiments of the present disclosure. The user interface 500 may facilitate use of the SCR pipeline 200, which may include the SCR automation features disclosed herein. The user interface 500 may expose deployment stages of the SCR pipeline 200 with user interface elements graphically depicting the deployment stages and current statuses of the deployment stages, along with user-selectable user interface elements for a user to provide input, make selections, and control aspects of the SCR pipeline 200. For example, the user interface 500 may include buttons to execute, pause, stop, cancel, and/or the like one or more operations and/or stages of the SCR pipeline 200. By a user selecting a play button, for example, the pipeline stage may execute and the process flow may transition to the next step/stage. The buttons may be configured to not be displayed, or be displayed but be unselectable, until the corresponding SCR has progressed through the pipeline 200 such that one or more operations corresponding to the buttons are currently available as options. With the user interface 500, the subsystem 300 may provide updates as an SCR moves through the SCR pipeline 200.

Referring again to FIG. 3, the monitoring engine 336 may access any suitable pipeline information. For example, when a button is clicked, pertinent information may be captured from the pipeline. By way of further example, the monitoring engine 336 may listen for and learn the name of the app, team member identifiers, timestamps, version of the app, and/or the like, such information may be collected at any suitable time, including, for example, when a kickoff trigger of cutting a tag in the software repository system 103 is detected, so the monitoring may take a snapshot of the pipeline configuration at that moment when the pipeline kickoff is triggered.

Disclosed embodiments may provide for identification, learning, and recognition of how to accelerate SCRs and software changes, for example, using the learning engine 338 of the pipeline controller 308 in some embodiments. Based at least in part on the data composites 359, the learning engine 338 may learn rules 358 corresponding to one or more software change request protocols. In some embodiments, the rules 358 may define formatting for the population of the various fields, conversions the user input 306 into the format and form required by the fields, rules for validation of the user input 306, rules for validation of data composites 359 that are learned by the subsystem 300, and/or the like. Additionally or alternatively, the rules 358 may define mappings of the data composites 359 to requirements pertaining to software change request operations of the deployment pipeline. A plurality of pipeline data fields may be associated with each SCR. Each of the data fields may be associated with one or more input attributes. The input attributes may specify input requirements for each data field. The mappings may specify (e.g., with the input attributes) which data composites 359 and which user inputs 306 are for which data fields of an SCR. The rules 358 may further differentiate (e.g., with the input attributes) which fields are subsystem-populated with data composites 359 from which fields require user input 306. As disclosed herein, the learning engine 338, by way of its learning features, may decrease the input required for software change request over time. In so doing, the subsystem 300 may select a subset of input attributes from the plurality of input attributes in order to define which data fields are still requiring user input 306. Thus, over time, a decreased subset of input attributes may be associated with fields that still require user input 306.

Based at least in part on the subset of input attributes and the rules 358 corresponding to one or more SCR protocols, the pipeline controller 308 (e.g., with acceleration engine 340) may generate a set of objects to facilitate setup of a SCR. The set of objects may correspond at least in part to the data composites 359. The set of objects may be stored in association with the SCR. The set of objects may be populated at least in part with the data composites 359. The pipeline controller 308 may process developer input 306 received via a user interface of the deployment pipeline. The pipeline controller 308 may validate that the received input 306 conforms to a subset of a set of input requirements corresponding to the subset of input attributes and the rules 358. The SCR may be configured in accordance with the one or more SCR protocols, using the populated set of objects and the input 306. Further details, variations, and features are disclosed further herein in accordance with various embodiments.

The learning engine 338 may be an analysis engine configured to determine any suitable aspects pertaining to aspects of identification, learning, and recognition of how to accelerate SCRs and software changes based at least in part on pipeline input 302 received and processed by the monitoring engine 336. The learning engine 338 may include logic to implement and/or otherwise facilitate any taxonomy, classification, categorization, correlation, mapping, qualification, scoring, organization, and/or the like features disclosed herein. In various embodiments, the learning engine 338 may be configured to analyze, classify, categorize, characterize, tag, and/or annotate data corresponding to pipeline input 302 and associated SCRs and software changes. The learning engine 338 may employ one or more artificial intelligence (machine learning or, more specifically, deep learning) algorithms to perform pattern matching to detect patterns of metrics of pipeline input 302 and associated SCRs and software changes. In some embodiments, the monitoring engine 336 and/or the learning engine 338 may facilitate one or more learning/training modes. Accordingly, the learning engine 338 may facilitate machine learning or, more specifically, deep learning, to facilitate creation, development, and/or use of pattern data regarding pipeline input 302 and associated SCRs and software changes.

The pipeline controller 308 may include an SCR acceleration engine 340 configured to cause the one or more adjustments to accelerate SCR and software change processes based at least in part on learned data composites 359 and rules, as well as minimized user-provided parameters, so that required developer input may be decreased over time. In some embodiments, the separation engine 340 may analyze determinations of the learning engine 338, such as learned rules 358 and/or data composites 359 to adjust pipeline operations in order to create, process, progress, and otherwise facilitate SCRs and software changes based on decreased developer input. The separation engine 340 may cause activation of one or more corresponding adjustment operations in the pipeline. The pipeline controller 308 may transmit one or more signals to one or more processing devices and/or one or more applications of the pipeline to cause the one or more operations adjustments.

Before an app is promoted to test deployment 240, an SCR may be created through service API calls. The SCR may be created based at least in part on an initialization file. An initialization file may specify input that may be required from the developer to create the SCR. An API may be provided to validate, accept, and/or reject the parameters entered by the user. For example, the pipeline controller 308 may check the sourced URL 430 of the source code to validate its existence and accessibility in a software repository system 103.

In order to create the SCR, the pipeline infrastructure 102 may set options for the SCR and call necessary APIs to create the software change based at least in part on the user inputs, derivations, general defaults, any software specific defaults, and/or the like. The SCR may be controlled to conform to one or more software change request protocols that may specify requirements for the SCR in order for the pipeline to process and progress the SCR to ultimately make the software change in production. The one or more software change request protocols may be specified by rules 358, which may be linked with a table, index, key-value data structure, and/or the like.

In some embodiments, the learning engine 338 may learn from SCR and software change processes as SCRs and software changes flow through the pipeline, making inferences from such monitored processes and corresponding input. Based at least in part on the monitoring and the pipeline input 302 received, the learning engine 338 may create data composites 359, where each data composite may include pipeline information associated with one or more operations of the deployment pipeline. The learning engine 338 may store data composites 359 in data composite storage 359 (e.g., linked with a table, index, key-value data structure, and/or the like). The data composites 359 may include one or combination of metadata, objects, fields, parameters, code, references, locators, and/or the like. In some embodiments, the learning engine 338 may learn different SCR types and corresponding attributes of the different types. The learning engine 338 may specifications of the different SCR types and corresponding attributes in a table, index, key-value data structure, and/or the like in a categories data storage 312.

Utilizing the user input 306 for a particular SCR instance, the acceleration engine 340 may generate an SCR structure and generate the remaining parameters based at least in part on the data composites 359 and the rules 358, which may include learned rules. In some embodiments, for a particular set of input for an SCR, the acceleration engine 340 may match the particular set of input to attributes of for a particular type of SCR, using the categories data storage 312, which may include mappings of data composites 359. Mappings of data composites 359 may be defined by the learning engine 338 and/or the acceleration engine 340 for various types of SCRs. The acceleration engine 338 may make use of learned default values particularized to the SCR type to create setup objects for an SCR structure.

For a particular type of SCR, the acceleration engine 340 may generate the SCR structure, as well as the remaining parameters, using the data composites 359 and the rules 358. In various embodiments, the acceleration engine 340 may use underlying tables and/or SCR templates that the acceleration engine 340 may populate with data composites 359 (at least in part, for example, with metadata, parameters, objects, and/or the like data of the data composites 359) and structure according to the rules 358. Accordingly, the acceleration engine 340 may assign particular data composites 359 to the SCR structure for various different types of SCRs that may be initiated by developers with various sets of input.

Accordingly, the automatic SCR creation may include the pipeline infrastructure 102 receiving developer input 306, collecting data composites 359 of pipeline information associated with one or more operations of the deployment pipeline 202, and creating a draft of the SCR.

Figure 6A:
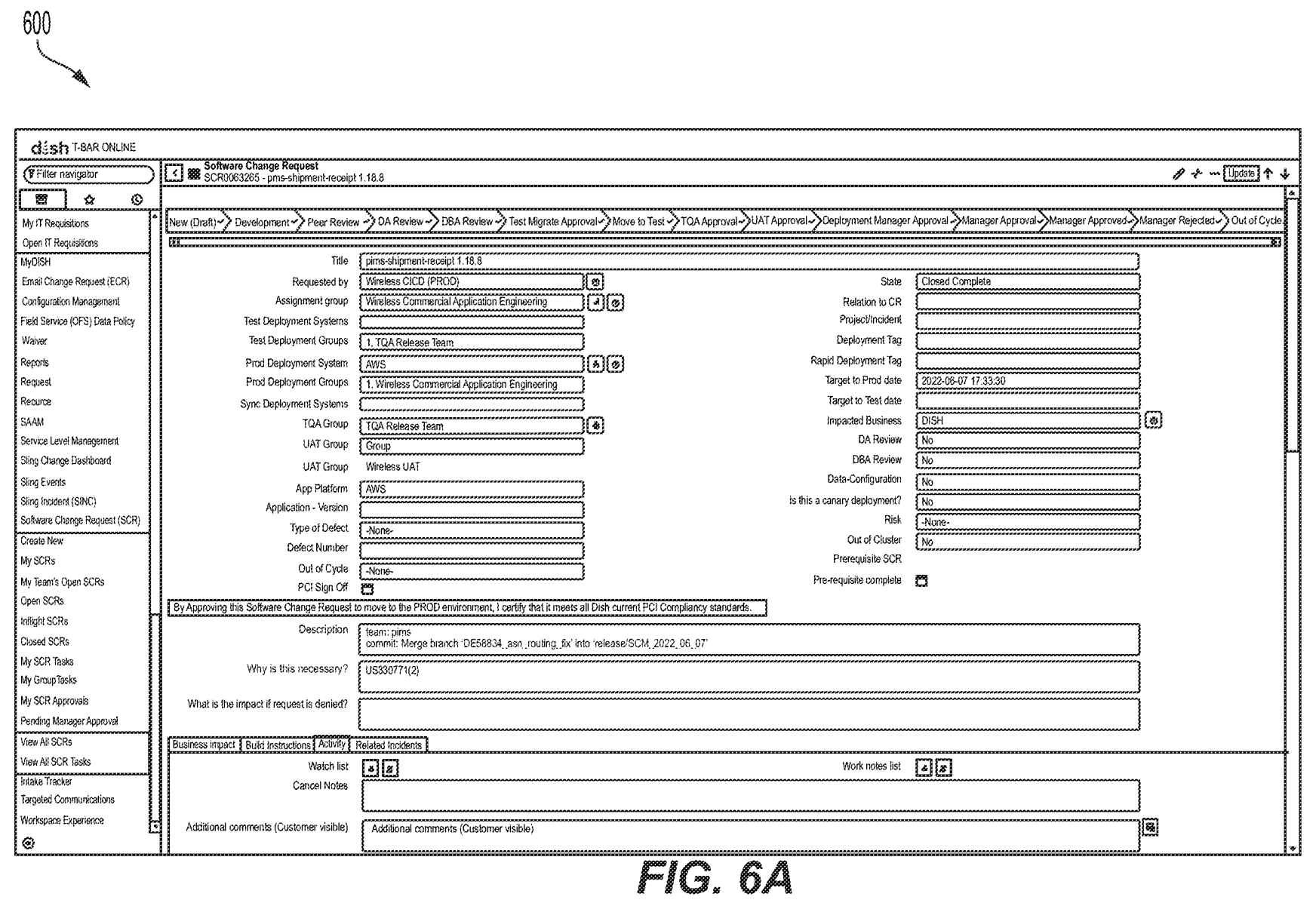
Figure 6B:
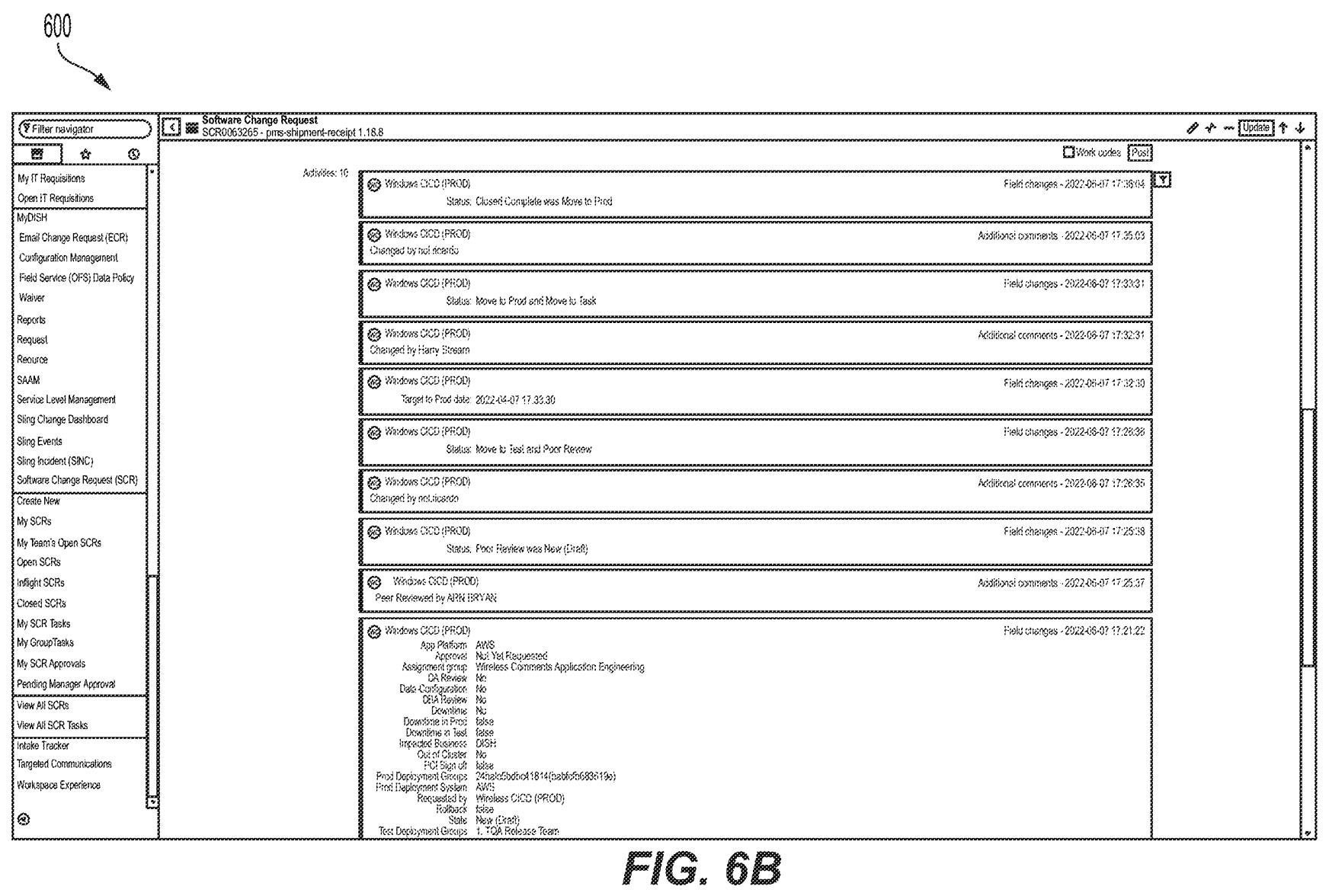

FIGS. 6A and 6B illustrate an example SCR 600, in accordance with embodiments of the present disclosure. The SCR 600 may be updated in real time. As disclosed herein, the subsystem 300 may process the input 302, generate data composites 359, populate the SCR 600, and update the SCR 600 and the user interface 500 to indicate the current state of the SCR 600 as the state of the deployment changes (e.g., moving from a draft state to peer review to test to prod, to close-complete or incomplete, etc.).

Conventional approaches, which involve manual entry of fields by developers, are lacking in visibility. Updates to an SCR with conventional approaches are not immediately effected; it could be hours or more after the event when an individual gets around to manually updating the SCR with an update that may be inaccurate. However, with disclosed embodiments, visibility may be greatly improved over conventional approaches because the visibility may be completely accurate and immediately updated due to the coupling with the automated application deployment. Whenever a state change associated with the SCR 600 occurs in the pipeline, it may be immediately reflected in the SCR 600 and the user interface 500 in a standardized manner. The subsystem 300 may populate the SCR 600 with any suitable information pertaining to the SCR 600, such as that depicted in the example. By way of example without limitation, the subsystem 300 may populate the SCR 600 with the minimized input corresponding to the input file 400; specifications of requesters, assignment groups, test deployment systems, test deployment groups, production deployment systems, production deployment groups, sync deployment systems, application platforms, application versions, types of defects, defect notifications, cycle specifications, SCR states, deployment tags, target dates, reviewers, descriptions, necessity descriptions, business impact, build instructions, activity log data, related incidents, timestamps corresponding to changes, changes, users making changes, change descriptions, test results, and/or the like. As the pipeline moves through its different states, data pertaining to the different states may be captured with an audit trail. The activity log, for example, may be updated to reflect state changes, users initiating the changes (e.g., users that clicked buttons of the pipeline for different stages of the pipeline, users that pushed code to production), triggered state changes, states of the SCRs (e.g., when an SCR is in test), when the state changes occurred, validations, users that signed off on close-complete deployments, and/or the like.

The acceleration engine 340 may move the SCR to a dev state. If that happens successfully, then the acceleration engine 340 may transition the SCR to the integration update SCR stage 220, where the acceleration engine 340 may update the SCR in integration so it moves it to a peer review state. The subsystem 300 may provide for assurance and authentication of peer review. A peer must be declared to have reviewed the code. With the peer review state, the acceleration engine 340 the process the developer input 306 to determine peer-reviewer specifications. The peer reviewer specifications (e.g., input 415 of input file 400) may specify one or more peer reviewers. The subsystem 300 may check attributes (e.g., which may be stored in the data storage 168) of the declared peer review to determine statuses of the peer (e.g., whether the individual is still with the company and still approved for access to the software repository 103). The pipeline infrastructure 102 may transmit when notifications to the specified one or more peer reviewers to prompt the peer review. In response, the one or more peer reviewers may provide validation input, which may be included in the user input 306. Once validation input is received and verified by the pipeline infrastructure 102, the controller 308 may progress the SCR further through the application deployment pipeline into a higher state. For example, the SCR may be moved into test state environments, which may correspond to the SCR testing update stage 225 and/or the deployment testing stage 230. Upon successful completion of the one or more testing stages, the SCR may be moved into a prod state, which may correspond to the SCR production update stage 235.

In various embodiments, features within the SCR automation may include security enforcement mechanisms. To satisfy compliance requirements, certain requirements may be identified as required for a deployment process, in order to meet a compliance audit in the future. One aspect of that may be separation of duty between users that contribute to the code and users that deploy that code into production. Conventionally, separation of duty is implemented by a separate, dedicated team that would perform the deployments. However, one problem with the conventional approach is that the separate team really does not have sufficient knowledge of the code base, which results in a lack of ownership and involvement with the code, which in turn results in errors, inefficiencies, and oversight of problems, such as malicious code, the prevention of which is one purpose of the separation of duties.

To address the disadvantages of the conventional approach, disclosed embodiments of the subsystem 300 (e.g., with the learning engine 338 and/or the acceleration engine 340) may provide for automation of the enforcement of security protocols, particularly before the code is promoted to production. To provide for segregation per the separation of duties, the subsystem 300 may access the development source code repository 250 and the pipeline history repository 250, inspect commit fields and unique digital identifiers corresponding to sources that have written code since the last successful production deployment, which may be identified by the subsystem 300 may correlating one or a combination of timestamps, state codes, event codes, production deployment identifiers, and/or the like from the development source code repository 250 and the pipeline history repository 250. The subsystem 300 inspection may include accessing a software repository 103 and/or 168 that may store the source code corresponding to a particular code base, reading the commit history, and compiling a list of unique digital identifiers corresponding to sources that have committed code. The list may be compared by the subsystem 300 to one or more unique digital identifiers corresponding to one or more users attempting to trigger a particular job to determine whether there the one or more unique digital identifiers match any unique digital identifiers specified by the list. Those who have contributed code since the last production deployment may be prohibited from being allowed to push. This may be a hard gate when the uniqueness condition is not satisfied. This may also enforce a sole actor prohibition; if only one user has written the code, that user may be prohibited from triggering the code in the pipeline. Only those who have not contributed code since the last production deployment may be allowed to trigger. In this manner, the subsystem 300 may automatically enforce compliance with the separation of duty requirements. In the event that a user attempts to trigger the job who is prohibited from doing so, not only may the triggering be prevented, but also feedback and notification may be provided to indicate who cannot push and to indicate instructions as to the separation of duty compliance requirements.

The subsystem 300 may provide for automation of the enforcement of software change request protocols, particularly before the code is promoted to production. For example, the subsystem 300 (e.g., with the learning engine 338 and/or the acceleration engine 340) may provide for field uniqueness enforcement. As the input 306, there may be a specification of necessity 430 (e.g., why the SCR is necessary). The subsystem 300 may evaluate the specification of necessity 434 uniqueness with respect to any and all previously-provided specifications for the corresponding software deployment, the corresponding version deployment, or for all software deployed by the subsystem 300. Likewise, other fields may be evaluated for uniqueness, such as description fields and/or the like. Such specification uniqueness comparisons may be evaluated in view of time windows, which may correspond to temporal constraints on the set of previously-provided specifications so the comparisons are only made with respect to those previously-provided specifications that were made within a particular timeframe (e.g., last week, last month, last year, etc.). The temporal constraints may be determined by a threshold of changes per particular time period that may be predefined and/or learned over time by the subsystem 300 based at least in part on the collected pipeline input 302.

The subsystem 300 may store previously provided specifications in the specifications repository 357. For example, words, strings, and/or n-grams of decomposed portions of the words/strings may be stored in indexes. The indexes may allow for string matching or approximate string matching at least partially based on decomposition of strings, such as into n-grams or words. The subsystem 300 may process characters of the specification of necessity provided for a particular SCR and they match the string of characters to those stored in the specifications repository 357. In some embodiments, the subsystem 300 may decompose the specification of necessity into sets of n-grams and compare the sets of engrams to those stored in the specifications repository 357 to determine whether the specification of necessity is unique with respect to those stored in the specifications repository 357. The sets of characters could be compared to index entries to assess similarity using any suitable algorithm. Some embodiments may identify intersections between multiple sets and assign a similarity score based on the extent of n-gram intersections between the search string and index entries, with a greater extent of an intersection of common characters indicating a greater degree of potential similarity between corresponding sets. The subsystem 300 may employ a threshold gate for the similarity score. If the similarity score satisfies the threshold, the input for the specification of necessity may be rejected, with the subsystem 300 transitioning the flow back and communicating appropriate notifications to the user and/or administrator to prompt review and resubmission. In some instances, an administrator may override the rejection with corresponding selections of user-selectable interface elements to force acceptance of the specification of necessity. In such cases, the learning engine 338 may employ learning/training mode to modify the similarity scoring as a function of administrative overrides collected over time for particular specifications. If the similarity score does not satisfy the threshold, the input for the specification of necessity may be validated and the pipeline flow may proceed.

Depending on the successor failure of the deployment, an SCR may be moved to a closed complete or closed incomplete state. This may satisfy the final compliance requirement. The final step may be closing the SCR, as indicated by stage 245 of FIG. 2. When the subsystem 300 has determined that the deployment is complete and validated, a developer can click a button of user interface to mark the software deployment as complete. If there is an issue such that the goal of deploying code was not complete, the subsystem 300 or a developer can mark the software deployment as incomplete, which may be in the infrastructure accordingly.

Figure 7:
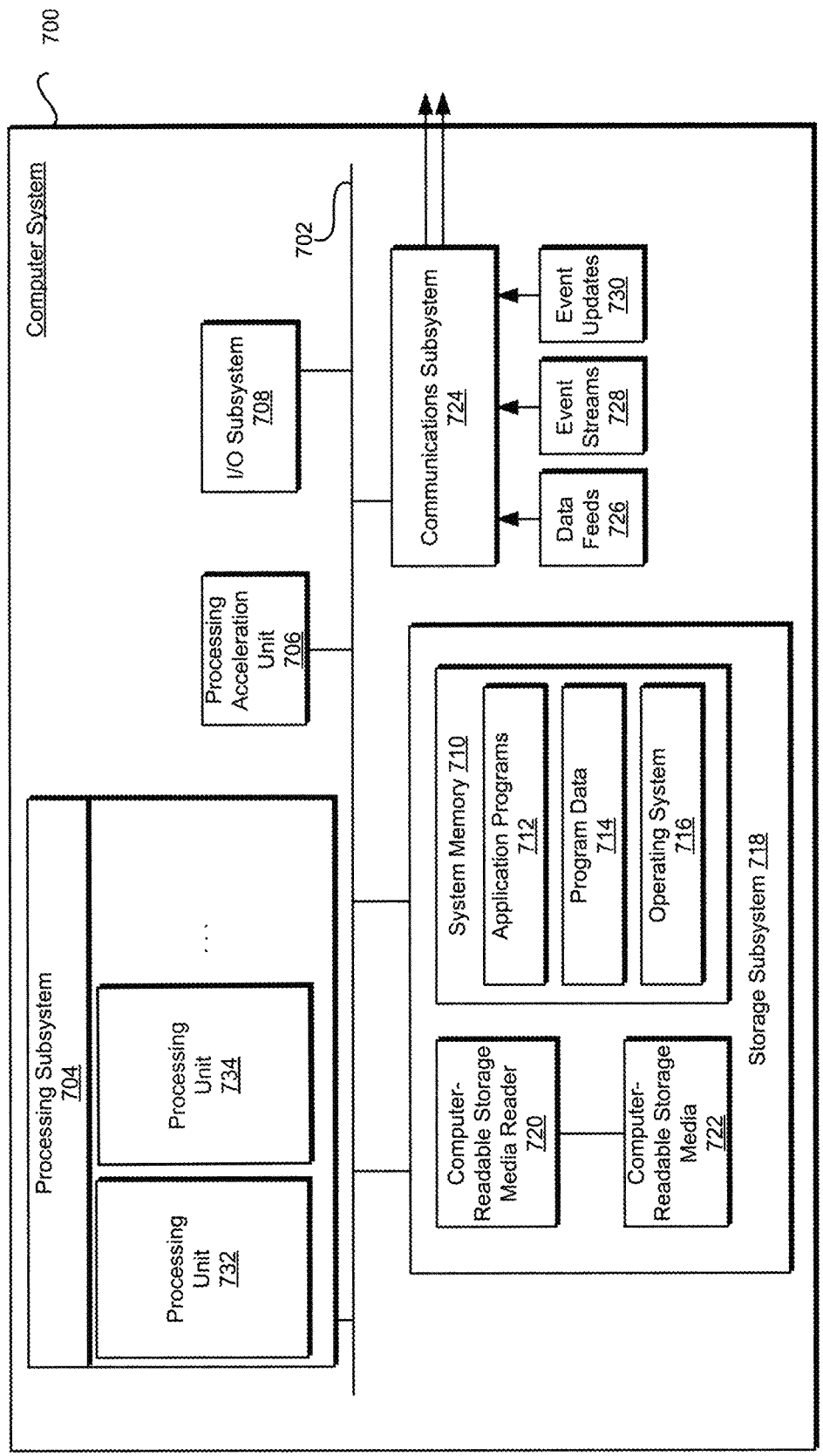
FIG. 7 illustrates an exemplary computer system, in accordance with embodiments according to the present disclosure.

FIG. 7 illustrates an exemplary computer system 700 that may be used to implement various embodiments. For example, in some embodiments, computer system 700 may be used to implement one or a combination of the pipeline infrastructure 102, subsystem 300, and various servers and computer systems described above. As shown in FIG. 7, computer system 700 includes various subsystems including a processing subsystem 704 that communicates with a number of other subsystems via a bus subsystem 702. These other subsystems may include a processing acceleration unit 706, an I/O subsystem 708, a storage subsystem 718, and a communications subsystem 724. Storage subsystem 718 may include non-transitory computer-readable storage media including storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 704 controls the operation of computer system 700 and may comprise one or more processors, application specific integrated circuits (ASICs), or field programmable gate arrays (FPGAs). The processors may include be single core or multicore processors. The processing resources of computer system 700 can be organized into one or more processing units 732, 734, etc. A processing unit may include one or more processors, one or more cores from the same or different processors, a combination of cores and processors, or other combinations of cores and processors. In some embodiments, processing subsystem 704 can include one or more special purpose co-processors such as graphics processors, digital signal processors (DSPs), or the like. In some embodiments, some or all of the processing units of processing subsystem 704 can be implemented using customized circuits, such as application specific integrated circuits (ASICs), or field programmable gate arrays (FPGAs).

In some embodiments, the processing units in processing subsystem 704 can execute instructions stored in system memory 710 or on computer readable storage media 722. In various embodiments, the processing units can execute a variety of programs or code instructions and can maintain multiple concurrently executing programs or processes. At any given time, some or all of the program code to be executed can be resident in system memory 710 and/or on computer-readable storage media 722 including potentially on one or more storage devices. Through suitable programming, processing subsystem 704 can provide various functionalities described above. In instances where computer system 700 is executing one or more virtual machines, one or more processing units may be allocated to each virtual machine. In certain embodiments, a processing acceleration unit 706 may be provided for performing customized processing or for off-loading some of the processing performed by processing subsystem 704 so as to accelerate the overall processing performed by computer system 700. In some embodiments, the processing acceleration unit 706 may correspond to the acceleration engine 340.

I/O subsystem 708 may include devices and mechanisms for inputting information to computer system 700 and/or for outputting information from or via computer system 700. In general, use of the term input device is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices that enable users to control and interact with an input device, game controllers, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 700 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 718 provides a repository or data store for storing information and data that is used by computer system 700. Storage subsystem 718 provides a tangible non-transitory computer-readable storage medium for storing the basic programming and data constructs that provide the functionality of some embodiments. Storage subsystem 718 may store software (e.g., programs, code modules, instructions) that when executed by processing subsystem 704 provides the functionality described above. The software may be executed by one or more processing units of processing subsystem 704. Storage subsystem 718 may also provide a repository for storing data used in accordance with the teachings of this disclosure.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM), dynamic random access memory (DRAM), and the like.

By way of example, and not limitation, as depicted in FIG. 7, system memory 710 may load application programs 712 that are being executed, which may include various applications such as Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 722 may store programming and data constructs that provide the functionality of some embodiments. Computer-readable media 722 may provide storage of computer-readable instructions, data structures, program modules, and other data for computer system 700. Software (programs, code modules, instructions) that, when executed by processing subsystem 704 provides the functionality described above, may be stored in storage subsystem 718. By way of example, computer-readable storage media 722 may include non-volatile memory such as a hard disk drive, a magnetic disk drive, an optical disk drive such as a CD ROM, DVD, a Blu-Ray™ disk, or other optical media. Computer-readable storage media 722 may include, but is not limited to, Zip drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. In certain embodiments, storage subsystem 718 may also include a computer-readable storage media reader 720 that can further be connected to computer-readable storage media 722. Reader 720 may receive and be configured to read data from a memory device such as a disk, a flash drive, etc.

In certain embodiments, computer system 700 may support virtualization technologies, including but not limited to virtualization of processing and memory resources. For example, computer system 700 may provide support for executing one or more virtual machines. In certain embodiments, computer system 700 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 700. Accordingly, multiple operating systems may potentially be run concurrently by computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client devices via the Internet for receiving and sending information from and to the client devices.

Communication subsystem 724 may support both wired and/or wireless communication protocols. For example, in certain embodiments, communications subsystem 724 may include radio frequency (RF) transceiver components for accessing wireless voice and/or data networks (e.g., using cellular telephone technology, advanced data network technology, such as 3G, 4G, 5G, or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

Communication subsystem 724 can receive and transmit data in various forms. For example, in some embodiments, in addition to other forms, communications subsystem 724 may receive input communications in the form of structured and/or unstructured data feeds 726, event streams 728, event updates 730, and the like. For example, communications subsystem 724 may be configured to receive (or send) data feeds 726 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 724 may also be configured to communicate data from computer system 700 to other computer systems or networks. The data may be communicated in various different forms such as structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art will appreciate other ways and/or methods to implement the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed:

1. A system comprising:
   one or more processing devices; and
   memory communicatively coupled with and readable by the one or more processing devices and having stored therein processor-readable instructions which, when executed by the one or more processing devices, cause the one or more processing devices to perform operations comprising:
      monitoring operations of a deployment pipeline for testing and deploying a software change to a production computing service, where the operations correspond at least in part to a set of input requirements for the testing and the deploying of the software change;
      based at least in part on the monitoring, collecting data composites in a data storage, where:
         each data composite comprises pipeline information associated with one or more operations of the deployment pipeline; and
         the collecting comprises:
            receiving the pipeline information via a network interface;
            creating the data composites, where the data composites comprise the pipeline information associated with the one or more operations of the deployment pipeline; and
            storing the data composites in the data storage;
      based at least in part on the data composites, learning rules corresponding to one or more software change request protocols, the rules defining mappings of the data composites to requirements pertaining to software change request operations of the deployment pipeline; and
      decreasing input required for a software change request based at least in part on the learning so that the input required for the software change request conforms to a subset of the set of input requirements.

2. The system as recited in claim 1, where the decreasing the input comprises selecting a subset of input attributes from a set of input attributes, the set of input attributes specifying data fields pertaining to the software change request, and the subset of input attributes specifying a subset of the data fields.

3. The system as recited in claim 2, the operations further comprising:
   based at least in part on the subset of input attributes and the rules corresponding to one or more software change request protocols, generating a set of objects to facilitate setup of the software change request, the set of objects corresponding at least in part to the data composites.

4. The system as recited in claim 3, the operations further comprising:
   processing input received via a user interface of the deployment pipeline, the received input conforming to the subset of the set of input requirements.

5. The system as recited in claim 4, the operations further comprising:
   storing the set of objects in association with the software change request; and
   populating the set of objects at least in part with the data composites.

6. The system as recited in claim 5, the operations further comprising:
   configuring the software change request in accordance with a software change request protocol, using the populated set of objects.

7. The system as recited in claim 1, where the collecting further comprises analyzing the operations corresponding to testing and/or deploying one or more software changes to identify the pipeline information associated with one or more operations of the deployment pipeline.

8. One or more non-transitory, machine-readable media having machine-readable instructions thereon which, when executed by one or more processing devices, cause the one or more processing devices to perform operations comprising:
   monitoring operations of a deployment pipeline for testing and deploying a software change to a production computing service, where the operations correspond at least in part to a set of input requirements for the testing and the deploying of the software change;
   based at least in part on the monitoring, collecting data composites in a data storage, where:
     each data composite comprises pipeline information associated with one or more operations of the deployment pipeline; and
     the collecting comprises:
       receiving the pipeline information via a network interface;
       creating the data composites, where the data composites comprise the pipeline information associated with the one or more operations of the deployment pipeline; and
       storing the data composites in the data storage;
   based at least in part on the data composites, learning rules corresponding to one or more software change request protocols, the rules defining mappings of the data composites to requirements pertaining to software change request operations of the deployment pipeline; and
   decreasing input required for a software change request based at least in part on the learning so that the input required for the software change request conforms to a subset of the set of input requirements.

9. The one or more non-transitory, machine-readable media as recited in claim 8, where the decreasing the input comprises selecting a subset of input attributes from a set of input attributes, the set of input attributes specifying data fields pertaining to the software change request, and the subset of input attributes specifying a subset of the data fields.

10. The one or more non-transitory, machine-readable media as recited in claim 9, the operations further comprising:
    based at least in part on the subset of input attributes and the rules corresponding to one or more software change request protocols, generating a set of objects to facilitate setup of the software change request, the set of objects corresponding at least in part to the data composites.

11. The one or more non-transitory, machine-readable media as recited in claim 10, the operations further comprising:
    processing input received via a user interface of the deployment pipeline, the received input conforming to the subset of the set of input requirements.

12. The one or more non-transitory, machine-readable media as recited in claim 11, the operations further comprising:
    storing the set of objects in association with the software change request; and
    populating the set of objects at least in part with the data composites.

13. The one or more non-transitory, machine-readable media as recited in claim 12, the operations further comprising:
    configuring the software change request in accordance with a software change request protocol, using the populated set of objects.

14. The one or more non-transitory, machine-readable media as recited in claim 8, where the collecting further comprises analyzing the operations corresponding to testing and/or deploying one or more software changes to identify the pipeline information associated with one or more operations of the deployment pipeline.

15. A method comprising:
    monitoring operations of a deployment pipeline for testing and deploying a software change to a production computing service, where the operations correspond at least in part to a set of input requirements for the testing and the deploying of the software change;
    based at least in part on the monitoring, collecting data composites in a data storage, where:
      each data composite comprises pipeline information associated with one or more operations of the deployment pipeline; and
      the collecting comprises:
        receiving the pipeline information via a network interface;
        creating the data composites, where the data composites comprise the pipeline information associated with the one or more operations of the deployment pipeline; and
        storing the data composites in the data storage;
    based at least in part on the data composites, learning rules corresponding to one or more software change request protocols, the rules defining mappings of the data composites to requirements pertaining to software change request operations of the deployment pipeline; and decreasing input required for a software change request based at least in part on the learning so that the input required for the software change request conforms to a subset of the set of input requirements.

16. The method as recited in claim 15, where the decreasing the input comprises selecting a subset of input attributes from a set of input attributes, the set of input attributes specifying data fields pertaining to the software change request, and the subset of input attributes specifying a subset of the data fields.

17. The method as recited in claim 16, further comprising:
based at least in part on the subset of input attributes and the rules corresponding to one or more software change request protocols, generating a set of objects to facilitate setup of the software change request, the set of objects corresponding at least in pan to the data composites.

18. The method as recited in claim 17, further comprising:
processing input received via a user interface of the deployment pipeline, the received input conforming to the subset of the set of input requirements.

19. The method as recited in claim 18, further comprising:
storing the set of objects in association with the software change request; and
populating the set of objects at least in part with the data composites.

20. The method as recited in claim 19, further comprising:
configuring the software change request in accordance with a software change request protocol, using the populated set of objects.

\* \* \* \* \*

UNITED STATES PATENT AND TRADEMARK OFFICE
CERTIFICATE OF CORRECTION

| | | |
|---|---|---|
| PATENT NO. | : 12,153,916 B2 | Page 1 of 1 |
| APPLICATION NO. | : 18/068126 | |
| DATED | : November 26, 2024 | |
| INVENTOR(S) | : Matthew Johnson | |

It is certified that error appears in the above-identified patent and that said Letters Patent is hereby corrected as shown below:

In the Claims

In Claim 17, Column 27, Line 16, please delete "pan" and insert -- part --

Signed and Sealed this
Eleventh Day of February, 2025

Coke Morgan Stewart
*Acting Director of the United States Patent and Trademark Office*